US012683231B2

(12) United States Patent
Meyer

(10) Patent No.:  US 12,683,231 B2
(45) Date of Patent:  Jul. 14, 2026

(54) BATTERY HOUSING FOR A VEHICLE BATTERY AND VEHICLE BATTERY

(71) Applicant: Webasto SE, Stockdorf (DE)

(72) Inventor: Mario Meyer, Stockdorf (DE)

(73) Assignee: Webasto SE, Stockdorf (DE)

( * ) Notice: Subject to any disclaimer, the term of this patent is extended or adjusted under 35 U.S.C. 154(b) by 766 days.

(21) Appl. No.: 18/094,703

(22) Filed: Jan. 9, 2023

(65) Prior Publication Data

US 2023/0223636 A1     Jul. 13, 2023

(51) Int. Cl.
| | |
|---|---|
| *H01M 50/262* | (2021.01) |
| *B60L 50/64* | (2019.01) |
| *H01M 50/244* | (2021.01) |
| *H01M 50/249* | (2021.01) |
| *H01M 50/258* | (2021.01) |

(52) U.S. Cl.
CPC ....... *H01M 50/262* (2021.01); *H01M 50/244* (2021.01); *H01M 50/249* (2021.01); *H01M 50/258* (2021.01); *B60L 50/64* (2019.02); *H01M 2220/20* (2013.01)

(58) Field of Classification Search
None
See application file for complete search history.

(56) References Cited

U.S. PATENT DOCUMENTS

| | | | | |
|---|---|---|---|---|
| 2014/0246259 A1* | 9/2014 | Yamamura | .......... | H01M 50/249 |
| | | | | 180/68.5 |
| 2021/0046621 A1* | 2/2021 | Park | .................... | H01M 50/244 |

FOREIGN PATENT DOCUMENTS

| | | | | |
|---|---|---|---|---|
| DE | 102012219782 A1 | 4/2014 | | |
| DE | 102019211190 A1 * | 1/2021 | ............ | H01M 50/30 |
| EP | 2916366 A1 | 9/2015 | | |
| WO | 2021018789 A1 | 2/2021 | | |

OTHER PUBLICATIONS

Machine Translation of the abstract of DE-102019211190-A1 (Year: 2021).*

* cited by examiner

*Primary Examiner* — Gregg Cantelmo
(74) *Attorney, Agent, or Firm* — Command IP LLP; Michael Zarrabian

(57) ABSTRACT

The present invention relates to a battery housing for a vehicle battery, comprising at least two wall elements, stacked one above the other in a stacking direction, in order to form in each case a housing wall, wherein each wall element comprises a pair of a through bore and a threaded bore, arranged next to the through bore in a plane perpendicular to the stacking direction, for screwing on a wall element which is directly adjacent in the stacking direction, wherein the threaded bores and through bores are arranged alternately one above the other with reference to the stacking direction; it moreover relates to a vehicle battery with such a battery housing.

20 Claims, 4 Drawing Sheets

BATTERY HOUSING FOR A VEHICLE BATTERY AND VEHICLE BATTERY

CROSS-REFERENCE TO RELATED APPLICATION

This application claims priority to German Application No. DE 10 2022 100 410.4 filed Jan. 10, 2022, which is incorporated herein by reference in its entirety for all purposes.

FIELD OF THE INVENTION

The present invention relates to a battery housing for a vehicle battery and to a vehicle battery for supplying the primary energy of a main drive of an electric vehicle.

BACKGROUND

It is known in the field of vehicle batteries to use a housing to shield from the environment the components provided for supplying the electrical energy, thus the battery cells and the electrical contact means such as busbars, etc.

A predetermined plurality of battery cells are often grouped to form a battery module which can then constitute a high-voltage component. In many cases, a battery module has an independent module housing which comprises at least one wall element and which encloses the electrical components of the battery module.

The electrical components can comprise, for example, battery cells, control electronics and/or sensors. The battery cells can be, for example, cylindrical battery cells, prismatic battery cells and/or pouch cells.

In particular in the case of vehicle batteries which supply the primary energy of the main drive of a vehicle, as is the case for electric vehicles, the vehicle battery is generally formed from a plurality of battery modules. Battery modules can be stacked one above the other in a stacking direction in order to form the vehicle battery. The module housings of adjacent battery modules stacked one above the other are screwed to one another by screw connections extending in the stacking direction in order to fix the modules relative to one another and thus form a joined-together battery housing of the vehicle battery. This is then called a multi-level battery housing. In conventional multi-level battery housings, the tool used to screw in the screw of the screw connection has to be introduced to the screw at a certain angle to the stacking direction because of the structural space. Some disadvantages can result therefrom. For example, a special shape of the tool blade or the tip of the tool blade may need to be provided, for example a custommade bit with a spherical head. Access to the screw connection can moreover be hampered. When a tool is introduced obliquely, it may also be possible to reliably control the torque only with difficulty. A tool introduced obliquely can moreover in theory result in the screw being screwed in aslant.

DESCRIPTION OF THE INVENTION

Starting from the known prior art, an object of the present invention is to supply an improved battery housing for a vehicle battery and a vehicle battery. In particular, at least one of the abovedescribed disadvantages is addressed by the abovementioned improvement.

The object is achieved by a battery housing for a vehicle battery having the features of claim 1. Advantageous developments result from the dependent claims, the description and the drawings.

Accordingly, a battery housing for a vehicle battery is proposed, comprising at least two wall elements, stacked one above the other in a stacking direction, in order to form in each case a housing wall.

The battery housing is characterized in that each wall element comprises a pair of a through bore and a threaded bore, arranged next to the through bore in a plane perpendicular to the stacking direction, for screwing on a wall element which is directly adjacent in the stacking direction, wherein the threaded bores and through bores are arranged alternately one above the other with reference to the stacking direction.

"One above the other" is understood here to be an arrangement with no misalignment relative to one another perpendicular to the stacking direction. In other words, each wall element has a pair of bores, wherein in each case one of the bores is designed as a threaded bore and the in each case other one of the bores is designed as a through bore. The threaded bores and through bores are arranged alternately with reference to the stacking direction. This means that, viewed in the stacking direction, a threaded bore of an adjacent wall element follows the through bore of the first wall element, or the threaded bore of the pair of bores of the adjacent wall element lies above the through bore of the pair of bores of the first wall element, and, viewed in the stacking direction, a through bore of an adjacent wall element follows the threaded bore of the first wall element, or the through bore of the pair of bores of the adjacent wall element lies above the threaded bore of the pair of bores of the first wall element.

The pairs of wall elements are consequently arranged above one another in the stacking direction.

Put differently again, the threaded bore and the through bore are arranged diametrically opposite each other in adjacent wall elements. Viewed in the stacking direction, threaded bores and through bores are therefore arranged alternately and lie one above the other in the stacking direction.

The battery housing consequently comprises two axes arranged at a predetermined spacing from one another and oriented in the stacking direction, wherein for each wall element in each case one bore of the pair lies on one axis of the two axes, and in each case the other bore of the pair lies on the other axis of the two axes, in other words is arranged substantially concentrically relative to the respective axis.

Because each wall element comprises a pair consisting of a through bore and a threaded bore, arranged next to the through bore in a plane perpendicular to the stacking direction, for screwing on a wall element which is directly adjacent in the stacking direction, wherein the threaded bores and through bores are arranged in alternating fashion one above the other, it is possible to screw together adjacent wall elements with no angular misalignment of the tool used relative to the stacking direction.

The tool, in particular a tool blade of the tool, can namely be passed through the through bore of the wall element recently placed on top parallel to the stacking direction. Because the threaded bore of the adjacent wall element lying underneath is situated precisely below the through bore of the upper adjacent wall element lying on top, the tool blade is then oriented substantially concentrically relative to the threaded bore in the stacking direction.

As a result, a screw provided for screwing the adjacent wall elements can consequently be screwed into the threaded bore oriented in the stacking direction using the tool oriented in the stacking direction. The risk of the screw being screwed in aslant can thus be reduced or even prevented altogether. Moreover, a tool with a standard bit can be used. In addition, the torque or tightening torque applied during the screwing can be calculated and/or set particularly precisely because of the lack of any angular misalignment. In particular, access to the threaded bore of the lower of the adjacent wall elements for a person screwing the wall elements can be facilitated compared with conventional multi-level battery housings.

The threaded bore can be designed as a continuous threaded bore or as a blind threaded bore. The depth of the thread of the threaded bore can be shorter than the total depth of the threaded bore or alternatively extend over the total length of the threaded bore.

According to a preferred embodiment, each wall element has the pair of bores on a first side viewed in the stacking direction, and preferably has, on a second side opposite the first side in the stacking direction, a flange for flange-mounting to the threaded bore of the wall element which is directly adjacent there.

The flange preferably comprises an opening for the passage of a threaded portion of a screw which is screwed or is to be screwed into the threaded bore of the adjacent wall element, wherein the opening and the through bore of a wall element and/or the opening of the wall element to be screwed, to which the wall element currently to be screwed is to be screwed, lie on a common axis oriented in the stacking direction.

The opening and the through bore of a wall element therefore lie one above the other in the stacking direction and therefore on the same position. Accordingly, for each wall element the opening and through bore lie spaced apart from each other in the stacking direction and substantially concentrically relative to each other on an axis extending or oriented in the stacking direction.

The opening is arranged, viewed in the stacking direction, on one side, for example the underside of the wall element, and the through bore or the pair of bores (through bore and threaded bore) on the other side, opposite the first side, of the wall element, for example an upper side of the wall element. The spacing between the opening and the through bore therefore corresponds substantially to the length or height of the wall element in the stacking direction.

According to a preferred development, the opening can have a circular cross-section. Accordingly, it preferably has the shape of a cylindrical through bore. Alternatively, the opening can also be designed as a slot, wherein the longitudinal extent of the slot then is preferably oriented perpendicularly to the stacking direction and lengthwise or parallel to a main extent or width of the wall element, to be more precise of a base plate of the wall element, transversely to the stacking direction. In other words, the longitudinal extent of the slot extends parallel to the wall of the wall element on a plane perpendicular to the stacking direction.

The wall element can be designed in such a way that its flange comprises, in the region of intersection with an axis running through the threaded bore of this wall element, a continuous region for covering the through bore of the wall element which is adjacent on the side of the flange in the stacking direction.

According to a preferred embodiment, the wall elements are each designed in the form of a casting, preferably a high-pressure die casting, wherein the bores of the pair are preferably formed in domes cast on the wall element, preferably on an outer side of the wall element.

Each wall is preferably connected on one side to a bottom element extending transversely to the stacking direction, wherein the wall element is preferably designed as a single piece with the bottom element, preferably as a one-piece high-pressure die-cast component which can then accordingly represent a preferably one-piece module housing.

According to a preferred embodiment, each wall element comprises a base plate extending in the stacking direction and perpendicularly thereto, wherein the base plate preferably extends in the stacking direction from a first side to a second side, wherein preferably at least one reinforcing rib preferably extends perpendicularly from the base plate, preferably on an outer side of the wall element, wherein preferably at least one reinforcing rib preferably extends perpendicularly to the stacking direction, and comprises in the stacking direction preferably at the level of the bores, at least one recess for the passage of a tool, preferably of a tool blade of a screwdriver.

According to a preferred embodiment, the threaded bore and the through bore of a pair are arranged next to each other perpendicular to the stacking direction and parallel to the extent of a base plate of the wall element.

The threaded bores and the through bores preferably extend in the stacking direction.

According to a preferred embodiment, the through bore is formed in the stacking direction for the passage of a tool, preferably of a tool blade of a screwdriver.

According to a preferred embodiment, the pairs of bores are arranged one above the other in the stacking direction.

According to a preferred embodiment, the threaded bore is designed as a continuous bore. In particular, when the wall element is a casting, for example a high-pressure die casting or an injection-moulded part, continuous holes can then already be provided in the cast blank which are drilled in a manufacturing step subsequent to removal from the mould accordingly to form the threaded bore or the through bore.

The object set above is furthermore achieved by a vehicle battery for supplying primary energy of an electric vehicle having the features of claim 9. Advantageous developments result from the present description and the drawings.

Accordingly, a vehicle battery is proposed which comprises at least a battery cell and a battery housing according to one of the above embodiments.

Because the vehicle battery comprises a battery housing according to one of the above embodiments, the advantages and effects described in terms of the battery housing can be obtained in a similar fashion by the vehicle battery too or apply in a similar fashion to the vehicle battery too.

The object set above is furthermore achieved by a wall element for forming a housing wall in a battery housing, preferably a vehicle battery housing having the features of claim 10. Advantageous developments result from the dependent claim, the present description and the drawings.

Accordingly, a wall element for forming a housing wall in a battery housing, preferably a vehicle battery housing, is proposed which comprises a base plate extending from a first side to the second side in the stacking direction, a pair of bores on a first side, composed of a through bore and a threaded bore, arranged next to the through bore in a plane perpendicular to the stacking direction, for screwing on a wall element which is directly adjacent to the first side, and on the second side a flange for flange-mounting to a wall element which is directly adjacent to the second side, wherein the flange comprises an opening for the passage of a threaded portion of a screw, wherein the opening and the through bore lie on a common axis oriented in the stacking direction.

The advantages and effects described in terms of the battery housing are obtained in a similar fashion by the wall element and these advantages and effects also apply in a similar fashion for the wall element.

According to a preferred embodiment, the flange comprises, in the region of intersection with an axis running through the threaded bore, a continuous region for covering a through bore of the wall element adjacent to the second side.

SHORT DESCRIPTION OF THE DRAWINGS

Preferred further embodiments of the invention are explained in detail by the following description of the drawings, in which.

DETAILED DESCRIPTION OF PREFERRED EXEMPLARY EMBODIMENTS

Preferred exemplary embodiments are described below with the aid of the drawings. The same or similar elements or those that have the same effect are here provided in the different drawings with identical reference signs and a repeated description of these elements has been dispensed with in part in order to avoid redundancy.

Figure 1:
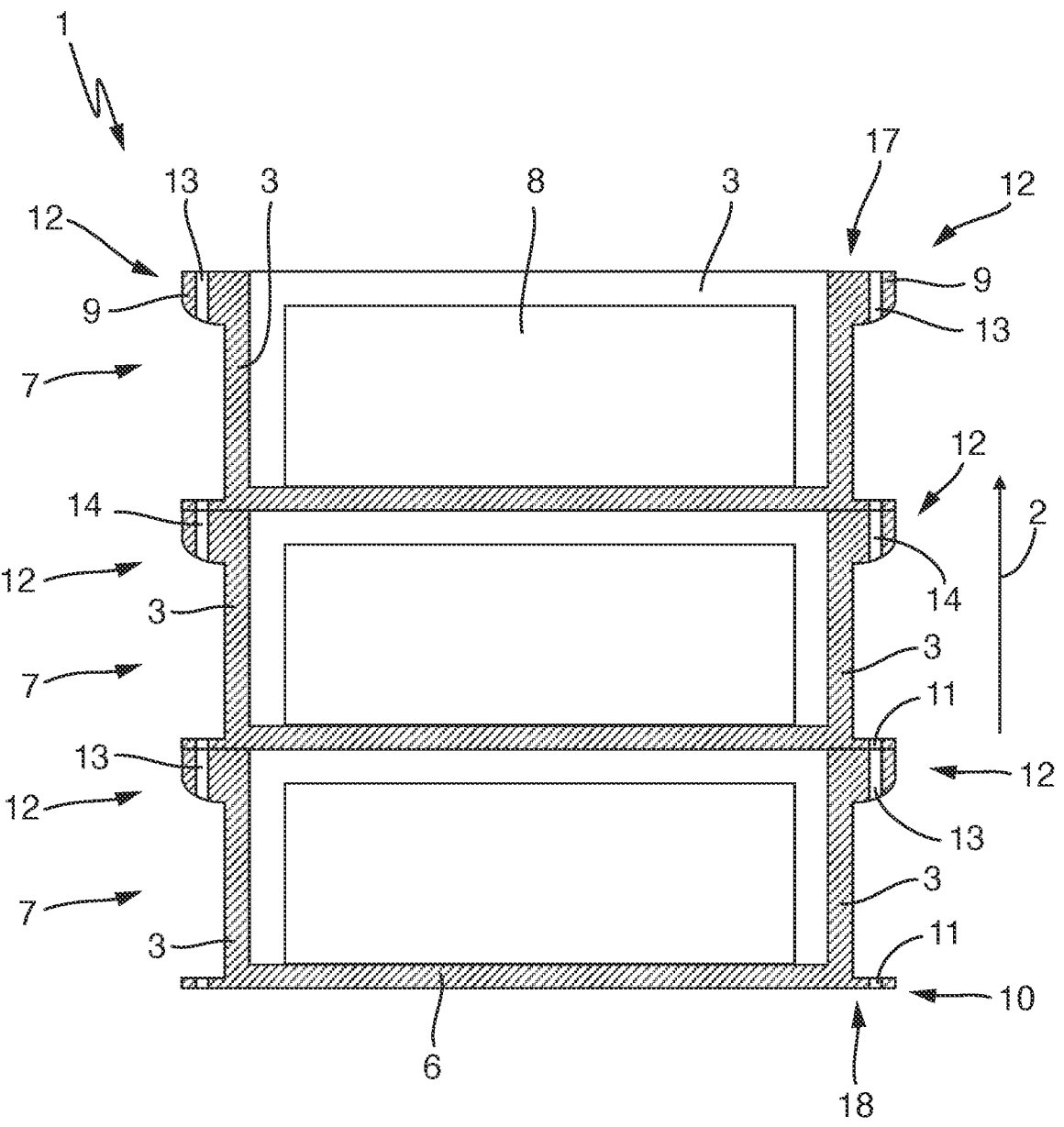
FIG. 1 shows schematically a view in section through a vehicle battery according to a first embodiment.

Shown schematically in FIG. 1 is a view in section through a vehicle battery 26 which supplies the primary energy of a main drive of an electric vehicle (not shown). The vehicle battery 26 has a multi-level battery housing 1 which comprises a plurality of module housings 7 stacked one above the other in a stacking direction 2. In the present case, the stacking direction 2 corresponds substantially to a bottom-to-top direction with reference to the installed position of the vehicle battery 7 in the electric vehicle, and in turn with respect to the main coordinate system, known to a person skilled in the art, of the electric vehicle.

Each module housing 7 comprises a bottom element 6 and wall elements 3, adjoining the bottom element 6 at the sides and formed as a single piece with the bottom element 6 and with the respective neighbour, for forming in each case one housing wall. Accordingly, each module housing 7 has substantially a trough shape.

The electrical components forming a battery module, which are indicated here schematically by means of the reference sign 8, are accommodated in each module housing 7. The electrical components 8 can comprise, for example, battery cells, control electronics and/or sensors. The battery cells can be, for example, cylindrical battery cells, prismatic battery cells and/or pouch cells.

Each wall element 3 has a pair 12 of bores 13, 14, each consisting of a through bore 14 and a threaded bore 14, arranged next to the through bore 14 in a plane perpendicular to the stacking direction 2, for screwing on a wall element 3 directly adjacent in the stacking direction 2.

The wall elements 3, optionally the module housing 7, are substantially formed in the same way. They therefore have substantially the same parts, with the exception of the arrangement of the bores 13, 14 of the pairs 12. The pairs 12 of the wall elements 3 stacked one above the other are in each case arranged one above the other in the stacking direction 2.

With regards to adjacent wall elements 3, the threaded bores 13 and the through bores 14 are arranged alternately one above the other with respect to the stacking direction 2.

As can moreover be seen in FIG. 1, each wall element 3 has the pair 12 of bores 13, 14 on a first side 17 (here the top side), viewed in the stacking direction 2, and comprises a flange 10, on a second side 18 opposite the first side in the stacking direction 2, for flange-mounting to the threaded bore 13 of the adjacent wall element 3 there. For this purpose, the flange 10 has an opening 11 for the passage of a threaded portion of a screw screwed into the threaded bore 13 (not shown here).

The opening 11 and the through bore 14 of a wall element 3 lie in each case on a common axis oriented in the stacking direction 2. In the present case, the openings 11 have a circular cross-section.

The module housings 7 are each designed in the form of a casting, preferably a high-pressure die casting. The bores 13, 14 of the pairs 12 are formed in domes 6 cast onto the wall element 3, and to be precise onto the outside of the wall elements 3.

Figure 2:
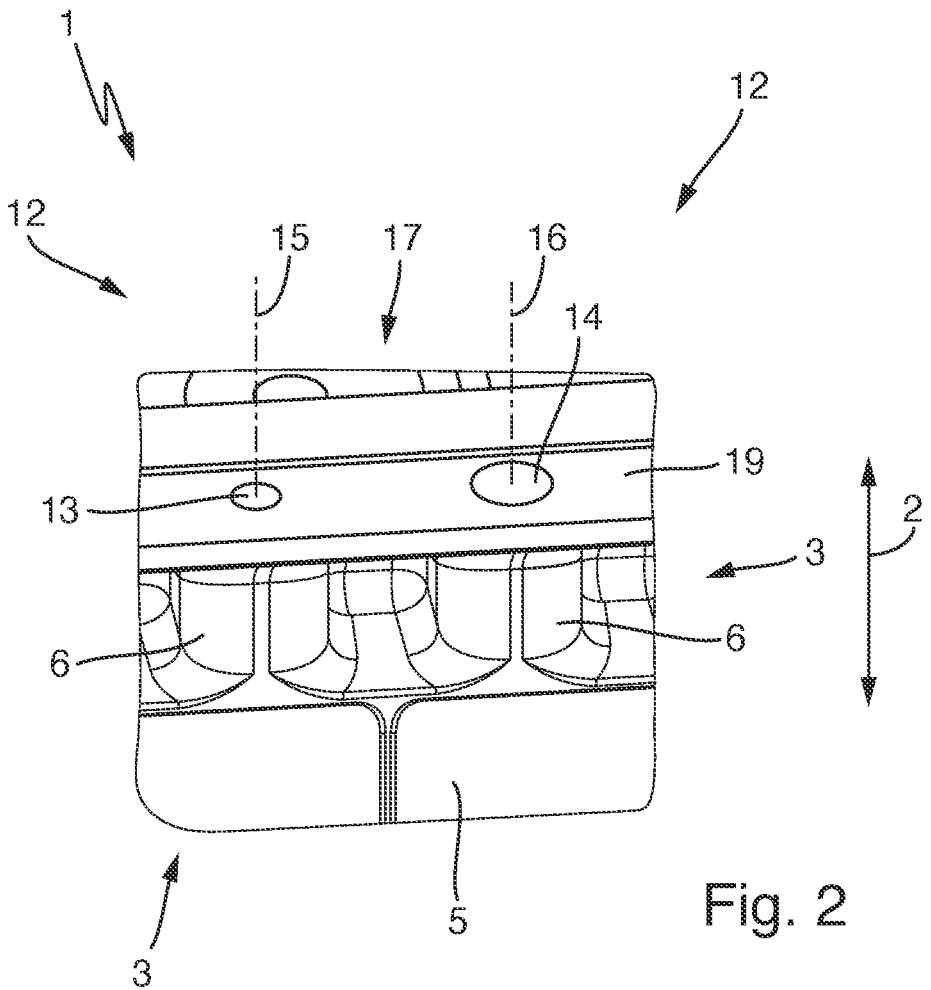
FIG. 2 shows schematically a perspective side view of a pair consisting of a threaded bore and a through bore of a wall element of a battery housing of the vehicle battery from FIG. 1.

FIG. 2 shows schematically a perspective detailed side view of a pair 12 of a threaded bore 13 and a through bore 14 of a wall element 3. Clearly visible are the domes 6 which extend outwards with respect to a base plate 5, extending in the stacking direction 2 and perpendicularly thereto, of the wall element 3, wherein the threaded bore 13 is formed in one of the domes 6 and the through bore 14 in the other dome 6. It can be seen that the internal diameter of the through bore 14 is greater than the threaded diameter of the threaded bore 13. The through bore 14 is designed for the passage in the stacking direction 2 of a tool, in the present case of a tool blade of a screwdriver, which is provided to screw the fastening screw into the threaded bore 13.

The threaded bore 13 extends along an axis 15 oriented parallel to the stacking direction 2, and the through bore 14 extends along an axis 16 which is arranged at a predetermined spacing from the first axis 15 and is oriented parallel to the stacking direction 2. At the upper end, therefore the first side 17, the wall element 3 comprises a shoulder 19 which serves for flange-mounting on the flange 10 of the wall element 3 which is adjacent in the stacking direction 2 (see FIG. 1) or for attaching a housing cover (not shown).

In other words, the threaded bore 13 and the through bore 14 of the pair 12 are arranged next to each other in a direction perpendicular to the stacking direction 2 and parallel to the extent of the base plate 5 of the wall element 3.

Figure 3:
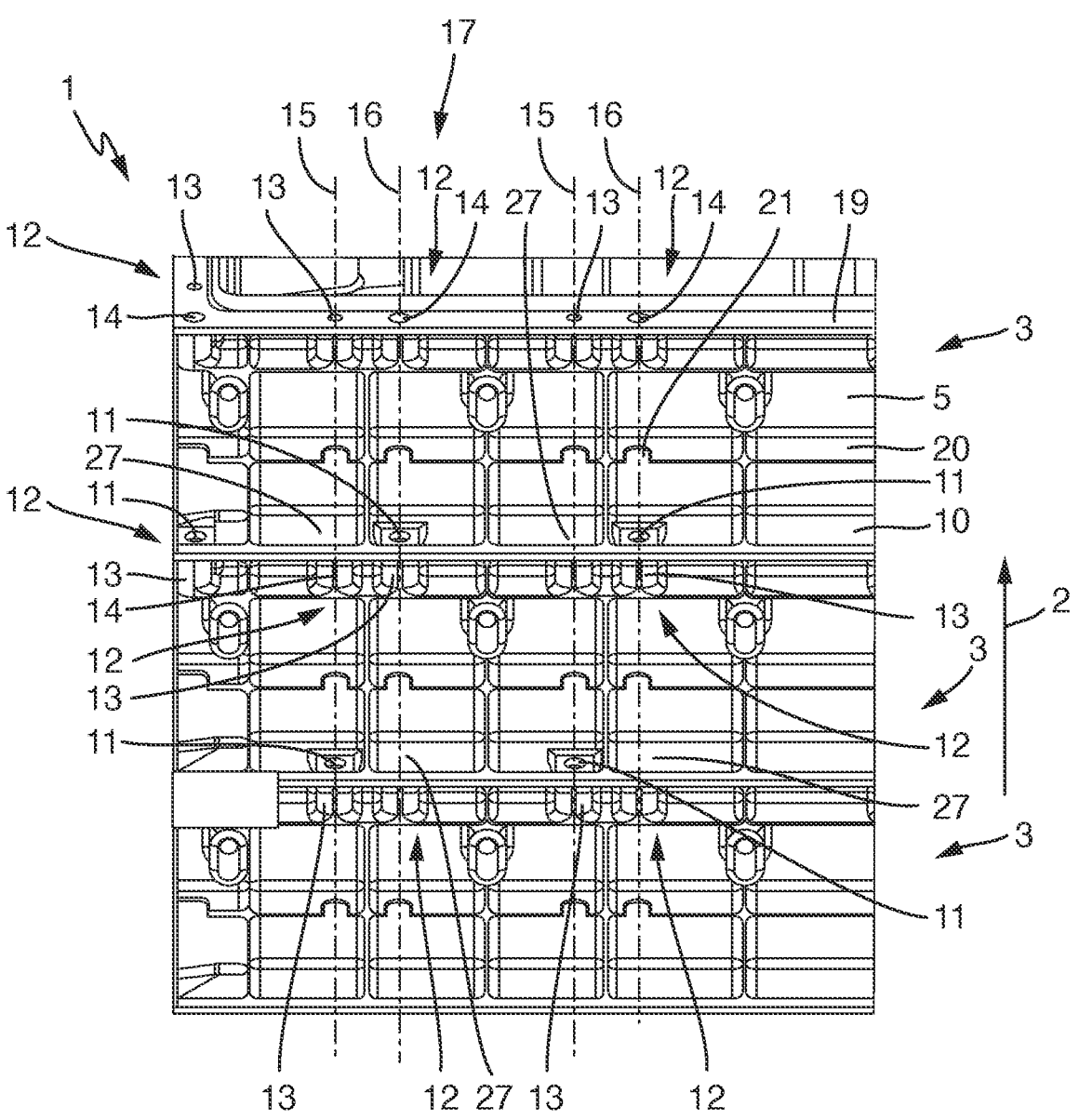
FIG. 3 shows schematically a perspective side view of a portion of a battery housing according to a further embodiment.

FIG. 3 shows schematically a portion of a multi-level battery housing 1 according to a further embodiment. The battery housing 1 corresponds substantially to that in FIGS. 1 and 2. The battery housing 1 shown in FIG. 3 has wall elements 3 which each have a plurality of pairs 12 of bores 13, 14. The pairs 12 of the wall elements 3 are uniformly distributed along the shoulder 19 transversely to the stacking direction 2.

The pairs 12 of wall elements 3 stacked one above the other are here arranged with respect to adjacent wall elements 3 in each case at the same positions, considered transversely to the stacking direction 2. In other words, in each case one pair 12 of a wall element 3 lies above and possibly below a respective pair 12 of each adjacent wall element 3 in the stacking direction 2.

Put differently, in each case one pair 12 of each wall element 3 is associated in each case with a pair of a first axis 15 and a second axis 16, as described in FIG. 2. Accordingly, the pairs 12, associated with the pair of axes 15, 16, of bores 13, 14 of wall elements 3 stacked one above the other, lie one above the other in the stacking direction 2. In each case one of the bores 13, 14 of these pairs 12 here extends along the first axis 15 and in each case the other of the bores 14, 13 of each of these pairs 12 extends along the second axis 16. The threaded bores 13 and through bores 14 are here arranged alternately.

As can be seen in FIG. 3, the flange 10 of each wall element 3 has an opening 11 aligned or substantially concentric with the axis extending through the through bore 14 and which is, by way of example, the axis 16 for the topmost wall element 3 in FIG. 3. Because the threaded bore 13 of the directly adjacent wall element 3—the central wall element 3 in FIG. 3—lies on the axis 16, the opening 11 lies above the threaded bore 13, or substantially concentrically therewith, of the adjacent (central) wall element 3. At the level of the other axis—the axis 15 in the case of the topmost wall element in FIG. 3—i.e. at the region of intersection between the axis 15 and the flange 10, the flange does not have an opening and instead has a continuous structure. It is therefore designed so that it is closed in the region of the axis 15. The flange consequently covers the through bore 14 of the adjacent wall element 3. In other words, the flange 10 is designed to cover the through bore 14 of the adjacent wall element 3. For this purpose, the flange 10 comprises a continuous region 27 which is designed to cover the through bore 14 of the adjacent wall element 3 on the second side 18.

As can moreover be seen in FIG. 3, each wall element 3 has a reinforcing rib 20 which extends on an outer side of the wall element 3 perpendicularly from the base plate 5 and perpendicularly to the stacking direction 2. At the level of the bores 13, 14, the reinforcing rib 20 has recesses 21 for the passage of the tool in the stacking direction 2.

According to a preferred embodiment, the reinforcing rib 20 can have a recess 21 only aligned with or substantially concentric with the through bore 14 and be designed as continuous in the region below the threaded bore 13 of the wall element 3 having the reinforcing rib 20, therefore at the intersection of the axis running through the threaded bore 13 with the reinforcing rib 20.

Figure 4:
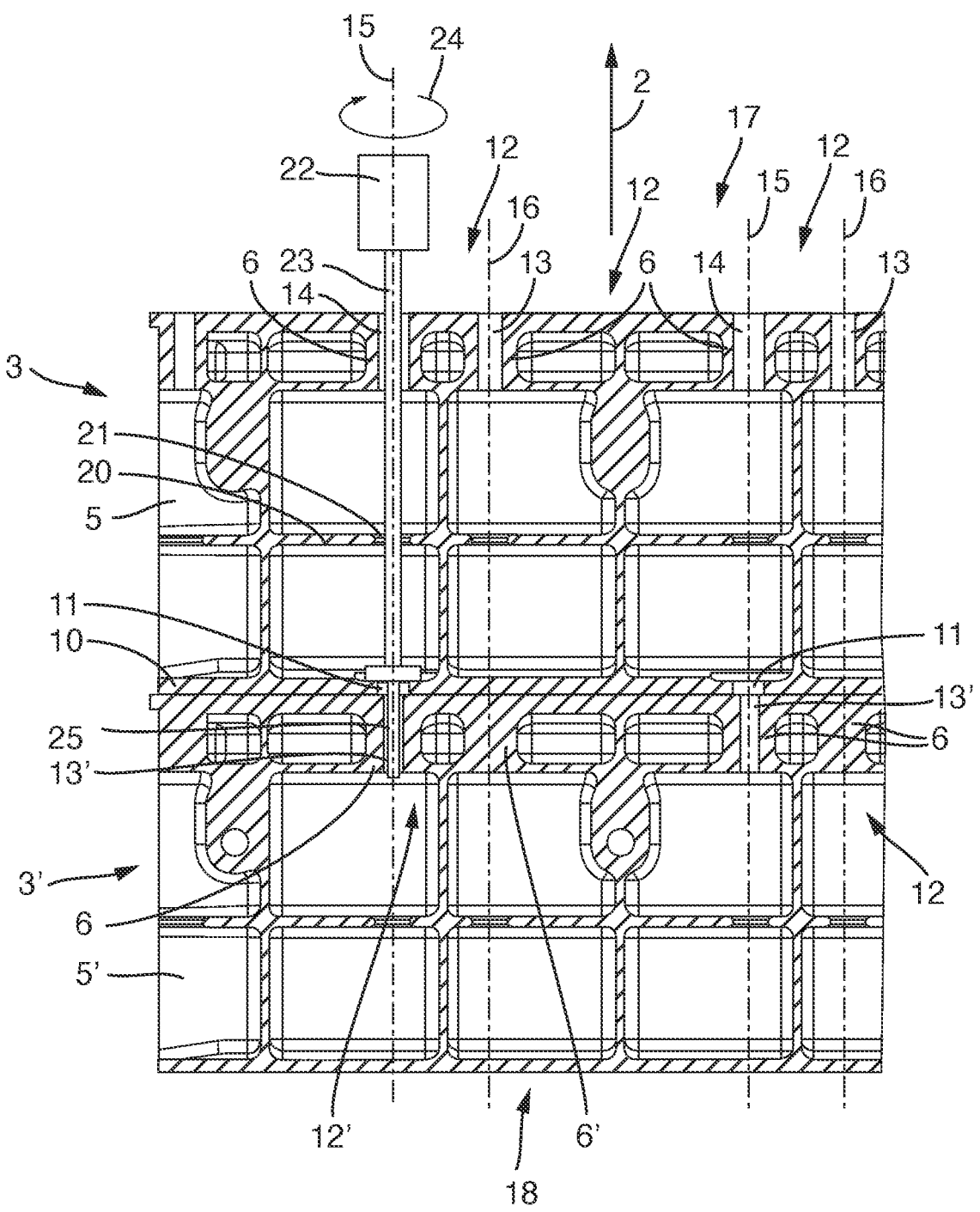
FIG. 4 shows schematically a view in section through the battery housing from FIG. 3.

FIG. 4 shows schematically a view in section through two adjacent wall elements 3 of the battery housing 1 from FIG. 3 along a plane defined by the axes 15, 16. Shown schematically here by way of example as an explanatory example is a screw 25 which passes through the opening 11 of the upper wall element 3 in FIG. 4 and is screwed into the threaded bore 13' of a pair 12' of the lower wall element 3' in FIG. 4.

A tool 22 for screwing the screw 25 into the threaded bore 13' is moreover shown. A tool blade 23 of the tool is pushed parallel to the stacking direction 2 substantially along the first axis 15 through the through bore 14 of the pair 12 and through the recess 21 of the reinforcing rib 20 of the upper wall element 3 and can thus be used to screw the screw 25 into the threaded bore 14 by rotation in the direction of rotation 24.

Because the lower wall element 3 in FIG. 4 represents the lowest of the wall elements 3 of the battery housing 1 and there is thus optionally no need for a through bore 14 here, the milling of the through bore in the right-hand dome 6' of the pair 12' of this lowest wall element 3 has optionally been dispensed with.

If applicable, all the individual features which are illustrated in the exemplary embodiments can be combined with one another and/or interchanged without going beyond the scope of the invention.

LIST OF REFERENCE SIGNS

1 battery housing
2 stacking direction
3 wall element
4 housing wall
5 base plate
6 bottom element
7 module housing
8 electrical components
9 dome
10 flange
11 opening
12 pair of bores
13 threaded bore
14 through bore
15 axis
16 axis
17 first side
18 second side
19 shoulder
20 reinforcing rib
21 recess
22 tool
23 tool blade
24 direction of rotation
25 screw
26 vehicle battery
27 continuous region

The invention claimed is:

1. A battery housing for a vehicle battery, comprising:
at least two wall elements, stacked one above each of the other wall elements in a stacking direction, in order to form in each case a housing wall;
wherein each wall element comprises a pair of; a through bore and a threaded bore, arranged next to the through bore in a plane perpendicular to the stacking direction, for screwing on a wall element which is directly adjacent a first side in the stacking direction;
wherein the threaded bores and through bores are arranged alternately one above the other with reference to the stacking direction.

2. The battery housing according to claim 1,
wherein each wall element has the pair of bores on the first side viewed in the stacking direction, and has, on a second side opposite the first side in the stacking direction, a flange for flange-mounting to the threaded bore of the wall element which is directly adjacent to the second side in the stacking direction;
wherein the flange of each wall element comprises an opening for passage of a threaded portion of a screw which is screwed into the threaded bore of an adjacent wall element;
wherein the opening and the through bore of each wall element lie on a common axis oriented in the stacking direction; and
wherein the flange of each wall element comprises, in a region of intersection with an axis running through the threaded bore of this wall element, a continuous region for covering the through bore of the adjacent wall element.

3. The battery housing according to claim 2, wherein the wall elements are each designed in the form of a casting, and wherein the bores of the pair are formed in domes formed on the wall element.

4. The battery housing according to claim 3, wherein each wall element comprises a base plate extending in the stacking direction and perpendicularly thereto.

5. The battery housing according to claim 4, wherein at least one of: the threaded bore and the through bore of a pair are arranged next to each other perpendicular to the stacking direction and parallel to an extent of a base plate of the wall element and the threaded bores and the through bores extend in the stacking direction.

6. The battery housing according to claim 5, wherein the through bore of each wall element is formed in the stacking direction for passage of a tool.

7. The battery housing according to claim 6, wherein the pairs of bores are arranged one above each of the other pairs of bores in the stacking direction.

8. The battery housing according to claim 7, wherein the threaded bore of each wall element is designed as a continuous bore.

9. The battery housing according to claim 3, wherein the wall elements are each designed in the form of a high-pressure die casting.

10. The battery housing according to claim 3, wherein the bores of the pair are formed in domes cast on each of the wall elements.

11. The battery housing according to claim 3, wherein the bores of the pair are formed on an outer side of each of the wall elements.

12. The battery housing according to claim 4, wherein each of the base plates extends in the stacking direction from a first side to a second side.

13. The battery housing according to claim 12, wherein at least one reinforcing rib extends perpendicularly from each of the base plates on an outer side of each of the wall elements.

14. The battery housing according to claim 12, wherein the at least one reinforcing rib extends perpendicularly to the stacking direction, and comprises in the stacking direction at least one recess for passage of a tool.

15. The battery housing according to claim 14, wherein the stacking direction is at the level of the bores, and wherein the at least one recess for the passage of a tool is configured to receive a tool blade of a screwdriver.

16. The battery housing according to claim 6, wherein each of the through bores are configured to receive a tool blade of a screwdriver.

17. A vehicle-Vehicle battery comprising:
at least one battery cell, characterized by a battery housing, wherein the battery housing comprises:
  at least two wall elements, stacked one above each of the other wall elements in a stacking direction, in order to form in each case a housing wall;
  wherein each wall element comprises:
    a pair of a through bore and a threaded bore, arranged next to the through bore in a plane perpendicular to the stacking direction, for screwing on a wall element which is directly adjacent to a first side in the stacking direction, wherein the threaded bores and through bores are arranged alternately one above the other with reference to the stacking direction.

18. A wall element for forming a housing wall in a battery housing, comprising:
a base plate extending from a first side to a second side in a stacking direction, on the first side a pair of a through bore and a threaded bore, arranged next to the through bore in a plane perpendicular to the stacking direction, for screwing on a wall element which is directly adjacent to the first side in the stacking direction, and on the second side a flange for flange-mounting to a wall element which is directly adjacent to the second side;
wherein the flange comprises an opening for passage of a threaded portion of a screw; and
wherein the opening and the through bore lie on a common axis oriented in the stacking direction.

19. The wall element according to claim 18, wherein the flange comprises, in a region of intersection with an axis running through the threaded bore, a continuous region for covering a through bore of the wall element adjacent to the second side.

20. The wall element according to claim 18, wherein the battery housing is a vehicle battery housing.

* * * * *